United States Patent Office
3,165,146
Patented Jan. 12, 1965

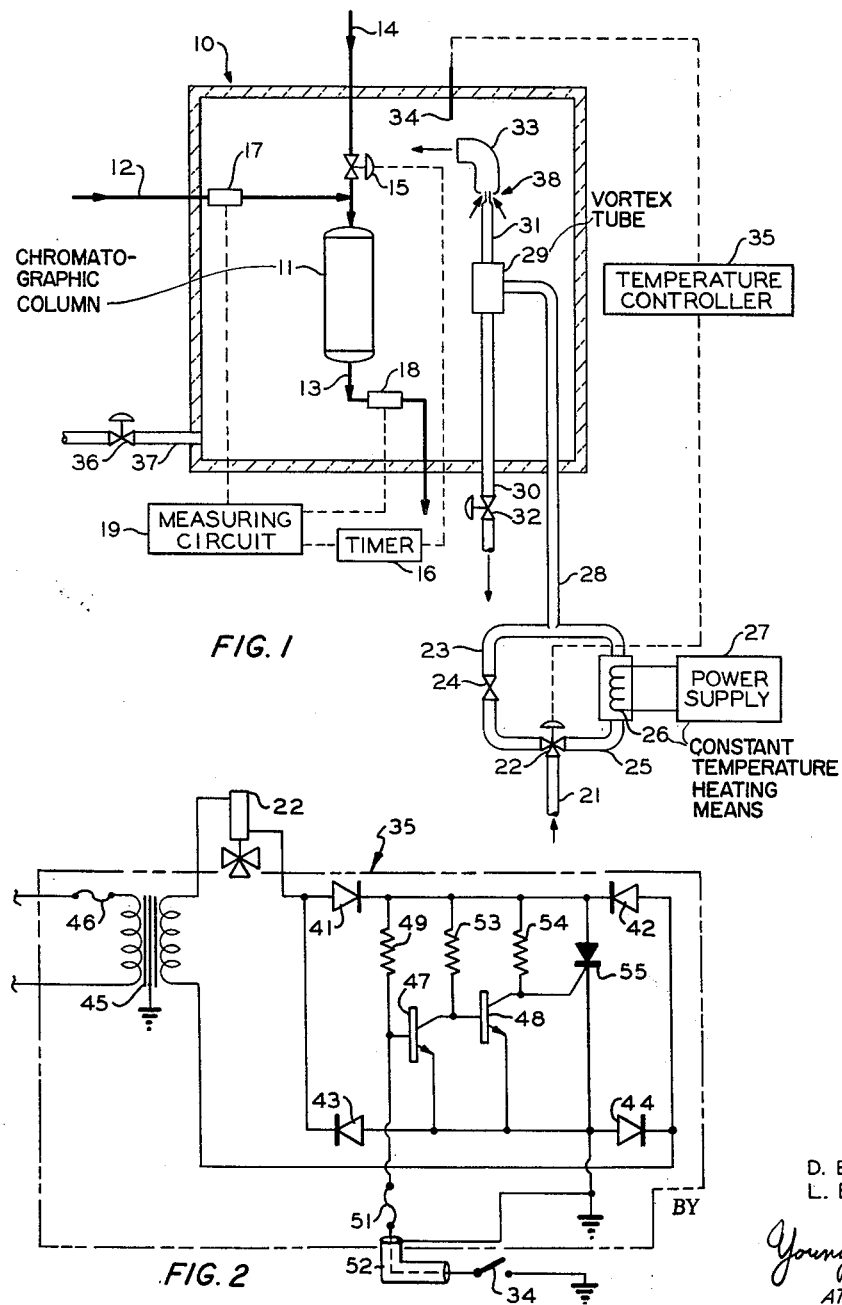

3,165,146
TEMPERATURE CONTROL SYSTEM
Dexter E. Smith and Lewis B. Roof, Bartlesville, Okla., assignors to Phillips Petroleum Company, a corporation of Delaware
Filed June 7, 1962, Ser. No. 200,819
10 Claims. (Cl. 165—2)

This invention relates to method and apparatus for controlling the temperature of a system. In one aspect the invention relates to controlling a temperature bath. In another aspect the invention relates to a chromatographic analysis system adapted to operate at reduced temperatures. In yet another aspect the invention relates to method and apparatus for regulating the temperature in an instrument housing. In a still further aspect the invention relates to method and apparatus for controlling the temperature in a system within the range of ambient temperature.

A standard practice for controlling the operating temperature of laboratory and automatic on-stream instrument is to thermostat the instrument at a sufficiently high temperature, such as 150° F., so that some supplementary heat must be added by the control system at the highest ambient temperature. Additional amounts of supplemental heat must be added by the control system at lower ambient temperature.

However, many instruments such as the chromatographic analyzer, operate at significantly increased efficiency at lower temperatures, such as in the range of −40° F. to 140° F. Complications arise, however, when the desired operating temperature of the instrument is within the normal range of ambient temperature. One of these complications is that part of the time there is a need for supplemental heat to be added to the system and part of the time there is a need for heat to be removed from the system.

In accordance with the present invention there is provided an improved temperature control system for maintaining the temperature of an object at a substantially constant value within the normal range of ambient temperature which comprises a source of fluid at ambient temperature, heating means, means for passing a first portion of the fluid from said source in heat exchanging relationship with said heating means, means for combining a second portion of the fluid from said source with the thus heated fluid, means for reducing the temperature of the thus combined fluid to said value, and means for passing the thus cooled fluid in heat exchanging relationship with said object.

Accordingly, it is an object of the invention to provide an improved temperature control system. Another object of the invention is to increase the efficiency of operation of various instruments. Yet another object of the invention is to provide for an improved chromatographic analysis system. A still further object of the invention is to provide an improved control system for regulating a temperature within the normal range of ambient temperatures. Another object of the invention is to provide improved method and apparatus for regulating temperatures within an instrument housing.

Other aspects, objects and advantages of the invention will be apparent from a study of the disclosure, the drawings and the appended claims to the invention.

In the drawings FIGURE 1 is a schematic representation of a control system in accordance with the invention in combination with a chromatographic analysis system, and FIGURE 2 is a schematic representation of a presently preferred temperature control circuit.

Referring now to the drawing and to FIGURE 1 in detail there is shown a housing 10, which can be made of thermally insulating material, and which contains a conventional chromatographic column 11 which is filled with a packing material that selectively retards passage therethrough of constituents of a fluid mixture to be analyzed. A carrier gas is introduced into the first end of column 11 through a conduit 12. A conduit 13 removes the effluent from column 11. A sample conduit 14, having a control valve 15 therein, communicates with the first end of column 11. Valve 15 is opened periodically for a preselected time interval by means of a timer 16 so as to introduce a predetermined volume of fluid sample to be analyzed into column 11. Although shown schematically, valve 15 can be any type of sample valve known in the art which permits the introduction of a predetermined volume of fluid sample.

First and second sensing elements 17 and 18 are disposed in respective conduits 12 and 13. These elements are adapted to compare a property of the fluid flowing through the two conduits to provide an indication of differences therebetween. These detecting elements are advantageously temperature sensitive resistance elements. The detecting elements are connected into a measuring circuit 19 which can be any suitable measuring circuit known in the art. Before the sample fluid is introduced into column 11, carrier gas flows through conduits 12 and 13 so that elements 17 and 18 respond to the same fluid and have identical outputs. Valve 15 is then opened to introduce a sample into column 11. The carrier gas elutes the constituents of the sample from the column in sequence so that element 18 responds sequentially to these individual constituents.

In order to maintain the temperature in housing 10 at a substantially constant value within the normal range of ambient temperature, gas from a suitable source at ambient temperature, such as plant process air, is transmitted through conduit 21 to three-way valve 22. A portion of the gas is transmitted through conduit 23 having a restriction 24 located therein, while the remainder of the gas is transmitted through conduit 25 and in heat exchanging relationship with heating element 26 located therein. Heating element 26 is maintained at a substantial constant temperature by means of power supply 27. While heating element 26 has been illustrated as an electrical resistance heater, any suitable heating means can be utilized. The gas in conduits 23 and 25 is combined in conduit 28 and transmitted to the input of Hilsch vortex tube 29. The operation of a Hilsch vortex tube is based on the Ranque-Hilsch effect. The gas passing through the inlet opening enters a tangential entry nozzle producing a vortex in the internal chamber. Energy distribution at this point is such that the heated fraction of the gas passes through the hot exit of tube 29 and conduit 30, while the cooled fraction of the gas, selected from the center mass of the vortex by a restricting orifice, emerges through conduit 31. A valve 32 can be utilized in conduit 30 to control the ratio of hot gas to cold gas produced. A more complete description of the vortex tube is set forth in U.S. Patent 1,952,281, issued March 27, 1934, and which is incorporated herein by reference. The drop in temperature below that of the inlet gas increases as the pressure drop between the inlet and cold outlet increases. For a given inlet pressure and outlet pressure, the temperature drop will be substantially constant regardless of variations in the inlet gas temperature. The cooled gas from conduit 31 passes through Venturi section 38 to cause intimate mixing of the gas with the gas already in housing 10. The mixed gas passes through conduit 33 and into housing 10. A temperature sensing means 34, such as a thermocouple, transmits a signal to temperature controller 35 representative of the temperature within housing 10. Temperature controller 35 regulates valve 22 to control the ratio of the amount of gas passed through conduit 23 to the amount of gas passed through conduit 25 responsive to the output signal of temperature sensing means 34. Valve 36 in conduit 37 can be utilized to remove excess gas from housing 10.

Thus if it is desired to maintain the temperature in housing 10 at 70° F. while ambient temperature varies from 40° F. to 110° F., vortex tube 29 can be set to provide a temperature drop between the inlet and cold outlet thereof on the order of 50° F. This necessitates that the temperature at the inlet of vortex tube 29 be on the order of 120° F. The differential between the 120° F. temperature and the maximum ambient temperature of 110° F. can be provided to permit constant control by temperature controller 35 of the amount of gas passed in heat exchanging relationship with heating element 26 as this is generally a finer degree of control than the control of vortex tube 29. Valve 22 is regulated by temperature controller 35 to bring the temperature of the gas in conduit 28 up to 120° F. Heating the gas and then cooling it to the desired temperature avoids the condensation of any water vapor in the gas which might occur if the gas was first cooled below the dew point temperature and then heated to the desired temperature. The utilization of a constant temperature heating element 26 eliminates any need for an explosive proof housing which could be encountered when utilizing a variable temperature heating element due to the making and breaking of electrical contacts. The control system of the invention has all the advantages of an electrical heating element without any of the disadvantages thereof as an explosion hazard. Temperature controller 35 can be any suitable device such as Foxboro pneumatic controller Model T/69 described in Bulletin 21–10A of May 1959.

In another embodiment of the invention valve 22 can be an on-off valve so that all of the fluid from conduit 21 is passed through either conduit 23 or conduit 25. Temperature controller 35 regulates the selection of the flow path utilized responsive to the sign of the ΔT between the temperature measured by temperature sensing means 34 and the desired temperature, that is, whether heat is to be added or removed from housing 10. Thus, when the temperature in housing 10 is higher than the desired temperature, controller 35 actuates valve 22 to pass all of the fluid from conduit 21 through conduit 23 and into conduit 28; however if the temperature in housing 10 is lower than the desired temperature, controller 35 actuates valve 22 to pass all of the fluid from conduit 21 through conduit 25 in heat exchanging relationship with heating element 26 and into conduit 28. Controller 35 regulates the amount of time each flow path is utilized proportional to that needed to maintain the desired temperature. The embodiment utilizing the on-off three way valve is simple and economical in both construction and operation.

The embodiment utilizing the on-off three way valve also provides an improved temperature control in reducing the magnitude of the "ripple" resulting from overshooting the desired temperature or drooping below the desired temperature. Such a ripple can be due to the time lag in raising heating element 26 from a first temperature to a second temperature or reducing heating element 26 from the second temperature to a no-load condition. Heating element 26 is at its normal operating condition such that when valve 22 directs fluid through conduit 25, the fluid is immediately subjected to the desired heat exchanging condition. Thus, with a decreasing temperature in housing 10, sensing element 34 can actuate valve 22 through controller 35 to immediately pass warmer fluid to the inlet of vortex tube 29, thus resulting in the introduction of warmer air in housing 10. With an increasing temperature in housing 10, valve 22 is actuated to cease the flow of fluid through conduit 25 and to pass the fluid through conduit 23, thus removing the fluid from contact with heating element 26. Thus the invention provides a more accurate control in comparison to devices where the fluid must always pass in heat exchanging relationship with the heating element.

While the presently preferred cooling means is the vortex tube, other suitable cooling means, such as indirect heat exchange with a refrigerant, can be utilized. While the heat exchanging fluid presently preferred for utilization with the vortex tube is gas, any suitable fluid can be utilized with other cooling means. While the invention has been illustrated in combination with a chromatographic analysis system, it is within the contemplation of the invention to control the temperature in any instrument housing, any temperature bath, or the temperature of any object.

Referring now to FIGURE 2 rectifiers 41, 42, 43 and 44 are connected to form a full-wave bridge rectification circuit. The actuation element of three-way valve 22 is connected between one terminal of the secondary winding of transformer 45 and the junction between rectifiers 41 and 43, while the second terminal of the secondary winding of transformer 45 is connected to the junction between rectifiers 43 and 44. The primary winding of transformer 45 is connected through a fuse 46 to a suitable source of electrical power, not shown in the drawings. The emitters of transistors 47 and 48 are connected to the junction between rectifiers 43 and 44. The base of transistor 47 is connected to the junction between rectifiers 41 and 42 by means of resistor 49 and to ground by means of fuse 51, co-axial cable 52 and thermostat switch 54. The collector of transistor 41 is connected to the junction between rectifiers 41 and 42 by means of resistor 53 and to the base of transistor 48. The collector of transistor 48 is connected to the junction between rectifiers 41 and 42 by means of resistor 54 and to the control electrode of silicon controlled rectifier 55. The cathode of silicon controlled rectifier 55 is connected to the junction between rectifiers 41 and 42 while the anode thereof is connected to the junction between rectifiers 43 and 44, which in turn is grounded.

In the operation of the circuit of FIGURE 2, when the thermostat switch 34 is opened, base current through resistor 49 causes transistor 47 to saturate and prevent transistor 48 from conducting. Current is then applied to the gate or control electrode of silicon control rectifier 55 through resistor 54, causing silicon controlled rectifier 55 to conduct and thus apply power to the actuating element of three-way valve 22. When a slight increase in temperature causes thermostat switch 34 to close, current through resistor 49 passes to ground through thermostat switch 34 so that current through resistor 54 is shunted through transistor 48 instead of the control element of silicon controlled rectifier 55. Silicon controlled rectifier 55 then remains in the non-conducting state so that power is essentially removed from the actuating element of three-way valve 22 except for small currents through resistors 49, 53 and 54.

For improved operation of the system it is desirable to avoid the use of the thermostat switch 34 in an explosion proof enclosure as this would increase the response time. Shorts in a given electrical circuit will not be capable of producing an explosion if the energy available from the circuit is sufficiently small. In the circuit of FIGURE 2 the electrical energy with respect to ground from the base connection of transistor 47 is sufficiently small to make the portion of circuit including the thermostat switch 34 intrinsically safe. Transformer 45 can be a shielded isolation transformer so that the junction between rectifiers 43 and 44 can be grounded. An open ground connection at either the junction between rectifiers 43 and 44 or at thermostat switch 34 or a component failure in the circuit would interrupt the normal operation of the circuit and thus be detected; however an additional fault would have to be present in the thermostat line in order to produce a potentially explosive situation.

While the temperature control system of FIGURE 2 is a presently preferred embodiment it is within the contemplation of the invention to utilize any suitable means for controlling three-way valve 22 responsive to the temperature in housing 10.

Reasonable variation and modification are possible within the scope of the foregoing disclosure, the drawing and the appended claims to the invention.

We claim:

1. A temperature control system including an object and means for maintaining the temperature of said object at a substantially constant value within the normal range of ambient temperature which comprises a source of fluid at ambient temperature, constant temperature electrical heating means, means for passing a first portion of the fluid from said source in heat exchanging relationship with said heating means, means for combining a second portion of the fluid from said source with the thus heated fluid, means for reducing the temperature of the thus combined fluid to said value, means for passing the thus cooled fluid in heat exchanging relationship with said object, and means for manipulating the ratio of the amount of said first portion to the amount of said second portion responsive to the temperature of said object.

2. Apparatus in accordance with claim 1 wherein said means for reducing the temperature of the combined fluid is a vortex tube.

3. Apparatus in accordance with claim 1 wherein said object is a chromatographic analyzer.

4. A temperature control system including an object and means for maintaining the temperature of said object at a substantially constant value within the normal range of ambient temperature which comprises a source of fluid at ambient temperature, a three way valve, means connecting said source to the inlet of said valve, first and second conduit means having respective first ends connected to first and second outlets of said valve, respectively, a restriction mounted in said first conduit means, an electrical resistance heating element mounted in said second conduit means, means for maintaining the temperature of said heating element substantially constant, a vortex tube, third conduit means connecting the respective second ends of said first and second conduit means to the inlet of said vortex tube, means for removing heated fluid from the hot exit of said vortex tube, means for removing cooled fluid from the cold exit of said vortex tube, means for passing the thus cooled fluid in exchanging relationship with said object, and means for manipulating said valve responsive to the temperature of said object.

5. Apparatus in accordance with claim 4 wherein said object is a chromatographic analyzer.

6. Apparatus in accordance with claim 4 wherein said valve is an on-off valve, and said means for manipulating said valve comprises means for actuating said valve to pass the fluid from said source through said first conduit when the temperature of said object is greater than said value and for actuating said valve to pass the fluid from said source through said second conduit when the temperature of said object is less than said value.

7. Apparatus in accordance with claim 4 wherein said valve is a proportioning valve.

8. A temperature control system including an object and means for maintaining the temperature of said object at a substantially constant value within the normal range of ambient temperature which comprises a source of fluid at ambient temperature, constant temperature electrical heating means, cooling means, means for passing fluid from said source in heat exchanging relationship with said heating means and passing the thus heated fluid to said cooling means when the temperature of said object is less than said value, and means for passing fluid from said source to said cooling means and bypassing said heating means when the temperature of said object is greater than said value, and means for passing the cooling fluid from said cooling means in heat exchanging relationship with said object.

9. A method for maintaining the temperature of an object at a substantially constant value within the normal range of ambient temperature which comprises providing a source of fluid at ambient temperature, heating in a constant temperature electrical heating zone a first portion of the fluid from said source to a temperature higher than said value, combining the thus heated first portion with a second portion of the fluid from said source, cooling the thus combined fluid to said value, passing the thus cooled fluid in heat exchanging relationship with said object, and manipulating the ratio of the amount of said first portion to the amount of said second portion responsive to the temperature of said object.

10. A method in accordance with claim 9 wherein said first portion is zero when the temperature of said object is greater than said value, and said second portion is zero when the temperature of said object is less than said value.

References Cited in the file of this patent

UNITED STATES PATENTS

| | | |
|---|---|---|
| 1,827,099 | Otis | Oct. 13, 1931 |
| 2,510,952 | Brewster | June 13, 1950 |
| 2,644,315 | Jamieson | July 7, 1953 |
| 2,671,643 | Gordon | Mar. 9, 1954 |
| 2,819,590 | Green | Jan. 14, 1958 |
| 3,026,681 | Green | Mar. 27, 1962 |
| 3,062,037 | Donner et al. | Nov. 6, 1962 |
| 3,122,014 | Dobbins | Feb. 25, 1964 |